United States Patent [19]

Starp et al.

[11] 4,372,662

[45] Feb. 8, 1983

[54] DIAPHRAGM SETTING DEVICE FOR PHOTOGRAPHIC CAMERA

[76] Inventors: Franz Starp, Mittlere Steige 36; Dieter Rittmann, Calwerstrasse 53, both of 7547 Wildbad 5, Fed. Rep. of Germany

[21] Appl. No.: 300,970

[22] Filed: Sep. 10, 1981

[30] Foreign Application Priority Data

Sep. 13, 1980 [DE] Fed. Rep. of Germany ....... 3034630
Jan. 17, 1981 [DE] Fed. Rep. of Germany ....... 3101388

[51] Int. Cl.³ ............................................... G03B 9/02
[52] U.S. Cl. ................................................. 354/273
[58] Field of Search .................. 354/198, 273, 289; 352/170

[56] References Cited

U.S. PATENT DOCUMENTS 3,448,673 6/1969 Singer et al. .................. 354/273

*Primary Examiner*—Russell E. Adams
*Assistant Examiner*—Alan Mathews

[57] ABSTRACT

Diaphragm setting device for a photographic camera lens shutter, which comprises an elongate carrier mounted on the outer periphery of the shutter housing and a movable slider operatively connected to the diaphragm adjusting ring of the lens shutter, such that the slider is displaceably supported and guided on the carrier and has a scale corresponding to diaphragm settings, whereby, e.g. manual, displacement of the slider causes the diaphragm adjusting ring to adopt the setting indicated on the slider scale. The carrier and slider of the diaphragm setting device may be attached to the shutter housing, advantageously either by means of screw fastenings or by means of a quick attachment and release plug arrangement, i.e. at an exterior location on the front rather than on the rear of the shutter housing.

21 Claims, 5 Drawing Figures

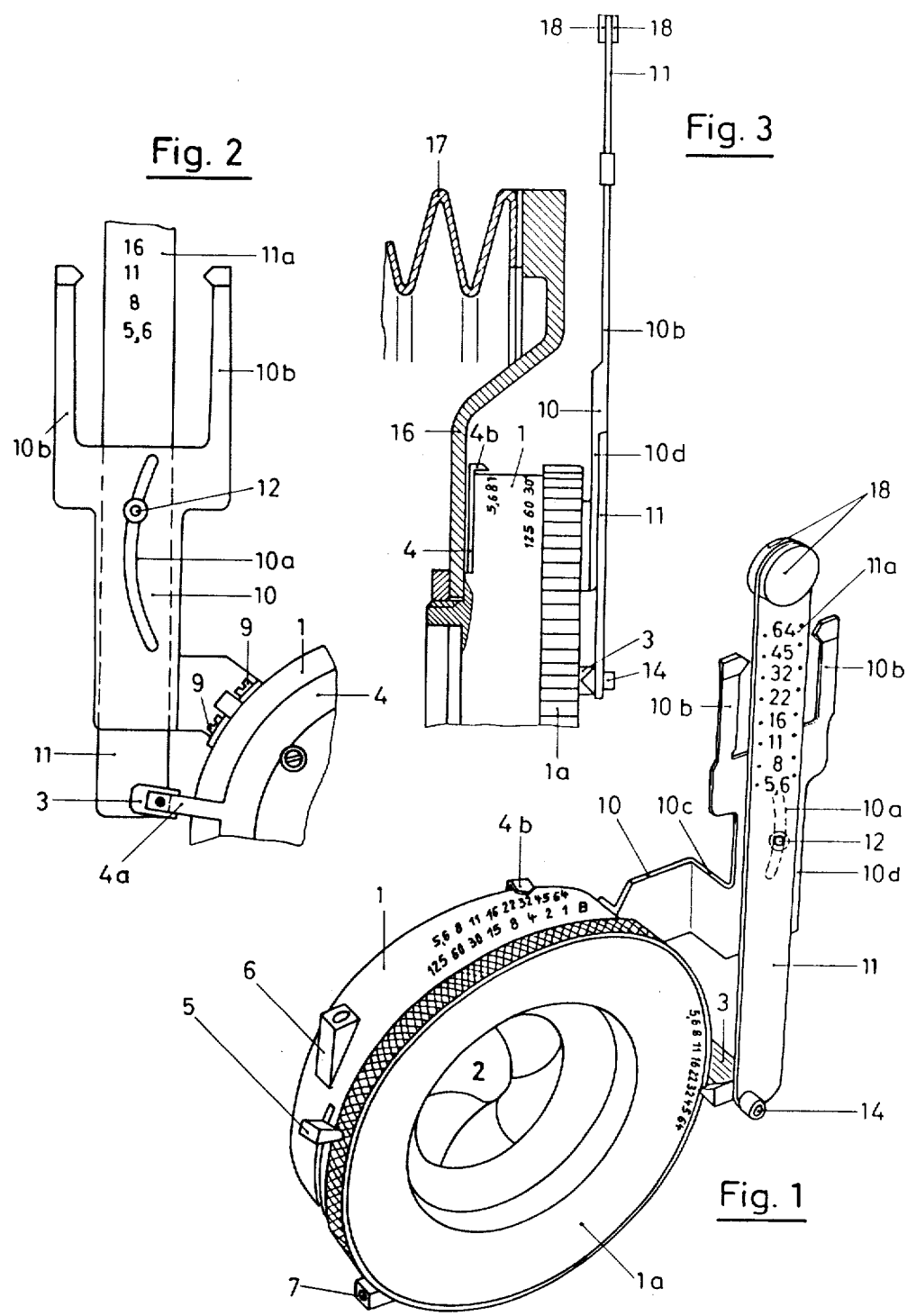

DIAPHRAGM SETTING DEVICE FOR PHOTOGRAPHIC CAMERA

The present invention relates to a diaphragm setting device for a photographic camera, especially a professional or studio camera having a lens shutter, whose diaphragm is selectively actuatable by means of a diaphragm setting ring in conjunction with a diaphragm setting scale and counterpart indicator mark.

In U.S. Pat. No. 3,448,673 a photographic camera is disclosed having a lens shutter, and also having an additional diaphragm setting device which is in operational engagement with the diaphragm setting ring and whose main advantage, especially significant in the case of professional and studio cameras, resides in providing a noticeably simpler operation by means of a timesaving and simplified diaphragm setting and monitoring operation from behind the camera.

The design of this known additional diaphragm setting device, which is simple to operate per se, is such that, if required, it can also be attached alternatively or subsequently, e.g. as an add-on device, to the lens shutter of a professional camera. For this purpose, however, the lens shutter must first be dismounted from the lens panel of the camera on which it is to be subsequently located. If this has been done, a pinion serving to transmit force from the adjusting slide of the device to the diaphragm setting ring or adjusting ring disposed on the rear of the lens shutter must be brought into engagement with a toothing portion provided on this adjusting ring, after prior adjustment, in order to attach the diaphragm setting device to the lens shutter. Only after the diaphragm setting device has been so attached or screwed to the rear of the lens shutter, i.e. via a screw connection thereat, and after a compensating spacer disc has been inserted, which disc corresponds in thickness to the diaphragm setting device, can the lens shutter again be attached to the lens panel of the camera and be correspondingly screwed thereto.

Quite apart from the problems which may be experienced by a layman, i.e. someone inexperienced in such matters, in subsequently fitting a diaphragm setting device of the above known type to a lens shutter due to the need for dismounting and remounting, and also for adjustment, such known arrangement has the additional disadvantage of constituting a design requiring numerous components including a plurality of stamped, plastic material and toothed components.

In addition, because such known arrangement is disposed on the rear side of the lens shutter, the diaphragm setting device can only be used with professional and studio cameras which are provided with a flat, front lens panel. However, cameras having a flat lens panel are generally not suitable for setting extremely short focal lengths because the bellows of such a camera only permits the rear lens carrier frame, which accommmodates the ground glass screen or the film plate to be exposed, to travel a specific limited distance.

It is among the objects and advantages of the present invention to provide, for cameras of the first mentioned type, a diaphragm setting appliance or arrangement, which avoids the above mentioned disadvantages associated with a multi-component construction of such a known diaphragm setting device, and also which avoids the necessity of making mounting adjustments and alignments in connection therewith which may present problems to the camera user.

Other and further objects and advantages of the present invention will become apparent from a study of the within specification and accompanying drawings, in which:

FIG. 1 is a schematic perspective view of a central interlens shutter for professional or studio cameras having a diaphragm setting device according to an embodiment of the present invention, which is mounted on the shutter by means of a screw connection;

FIG. 2 is a schematic partial view of the diaphragm setting device of FIG. 1 seen from behind the camera;

FIG. 3 is a schematic partial sectional side view of the front, upper portion of a bellows type camera having a lens panel, a lens shutter and a diaphragm setting device according to the embodiment thereof shown in FIG. 1;

Figure 4:
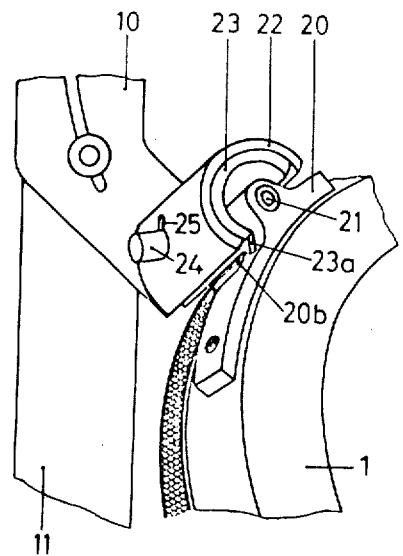
Figure 5:
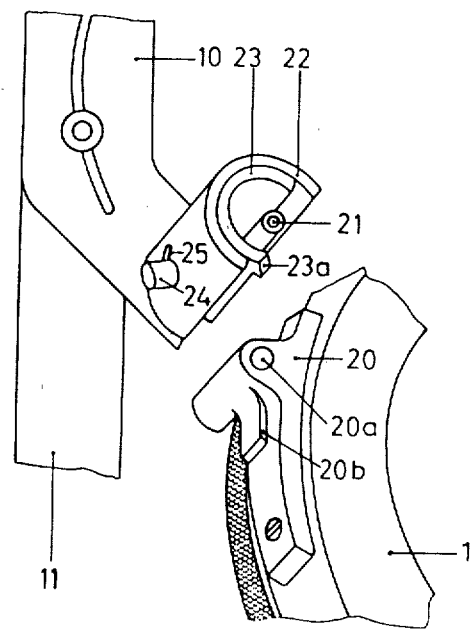

FIG. 4 is a schematic partial perspective view which shows, in accordance with an alternative embodiment of the present invention, a plug-in connection for mounting the diaphragm setting device, in the coupled and secured state; and FIG. 5 is a schematic partial perspective view which shows the plug-in connection of FIG. 4 in the detached state, i.e. prior to the attachment for mounting the diaphragm setting device on the shutter.

According to the present invention, a diaphragm setting device is advantageously provided for a photographic camera, of the type having a lens shutter whose diaphragm is selectively actuatable by means of a diaphragm adjusting ring in conjunction with a diaphragm setting scale and counterpart indicator mark, wherein the diaphragm setting device is mounted on the lens shutter and comprises an elongate carrier which extends tangentially relative to the shutter housing, and a setting slide which is movable relative to the carrier, the slide being in operational engagement with the diaphragm adjusting ring.

More specifically, the setting slide is preferably slidably guided on the carrier by means of a pin and slot connection, and the carrier is mounted on the shutter housing, such that the setting slide is connected at one end directly and in an articulated manner to the diaphragm adjusting ring.

Thus, it is possible to provide a diaphragm setting device according to the present invention which is especially distinguished for having few components and which is also distinguished for having a simple and reliable operational connection between the setting slide of the diaphragm setting device and the diaphragm adjusting ring which is present, in any event, in lens shutters.

Moreover, the instant diaphragm setting device is also distinguished in terms of associated technical prerequisites which enable a layman to fit such diaphragm setting device to the lens shutter of a professional or studio camera, both readily and easily.

In a preferred embodiment according to the present invention, the slotted form of the pin and slot connection may be adapted to the circular path of movement of the articulated connection between the setting slide of the diaphragm setting device and the diaphragm adjusting ring on the lens shutter, whereby the course of movement of the setting slide is largely linearized or arranged in a more or less straight line path, i.e. tilting movements of the slide during the diaphragm setting process can be essentially avoided.

One particularly simple operational connection according to the present invention, which enables the necessary coacting components to be reduced to a minimum, can be achieved merely by connecting the setting slide operatively in an articulated manner to the already existing grip part or driver part of the diaphragm adjusting ring on the lens shutter.

In order to enable the instant diaphragm setting device alternatively to be used also with those professional or studio cameras whose front lens panel extends rearwardly into the bellows chamber for the purpose of setting extremely short focal lengths, the carrier may be advantageously provided with a portion which is formed by an angled part or offset part so as to provide in turn a slide or guide face for the setting slide which lies in a plane disposed in front of the front plate of the shutter housing, i.e. after the instant device has been attached to the shutter housing.

A subsequent or add-on mounting of the instant diaphragm setting device can be considerably simplified, and can even be readily effected by the layman, according to the present invention, if the carrier of such diaphragm setting device is mounted on the periphery or barrel of the shutter housing, e.g. by a simple screw connection therewith. In addition, owing to such peripheral or external, i.e. front, mounting, no axial intermediate space or spacer disc, etc. of any kind need be provided to accommodate the setting device, as was necessary with the aforesaid known type of diaphragm setting device attached to the rear of the shutter rather than to its front as contemplated herein.

For specific categories of professional cameras, namely those which are used in studios and which are provided with front lens carriers which are displaceable backwards and forwards on a horizontal bar or the like, the above-mentioned type of screw connection between the particular diaphragm setting device and the lens shutter has proved to be entirely suitable and practical, since such additional diaphragm setting device can always remain on the shutter.

However, a complicated and time-consuming procedure would result using such a screw connection arrangement with folding or base board type cameras in that, with these cameras, every time the camera is used the front base board, forming at the same time a component of the camera housing, has to be swung out prior to the camera being used, i.e. to prepare the camera, and has to be swung back again afterwards so as to close the camera housing.

Thus, in order to mount any such additional diaphragm setting device on the shutter housing, where a screw connection is to be used with such a camera, the user of the camera must keep the required tools ready at hand and must allow for additional delay time to insert or loosen screws before or after using the camera, i.e. every time the camera is used, since any such additional setting device cannot remain on the camera during closure of the housing.

Hence, according to an alternative embodiment of the present invention, a rapid and simple mounting and dismounting of the instant diaphragm setting device in a very short time, without the need for tools, can be achieved, especially for cameras of the above-mentioned front base board type, in that, to retain the carrier of the device on the shutter housing, instead of a screw connection, a detachable plug in connection or quick attachment and release plug arrangement may be used which is automatically made secure during the mounting procedure by a locking means, i.e. on the front of the shutter housing.

Thus, for a folding or base board camera, a quick connect and quick disconnect arrangement can be provided according to the present invention which, every time the camera is used, enables the user to attach the diaphragm setting device to the lens shutter of the camera or to remove it from the camera in a matter of seconds, i.e. correspondingly before and after the camera is used.

In addition, a quick disconnect plug-in connection of the stated type also has the advantage that it eliminates the need for any tool and avoids the use of securing means, such as screws or the like, which must otherwise be loosened and inserted.

One embodiment of the diaphragm setting device according to the present invention, which can be provided in a form having a minimum of components, can be achieved by an arrangement involving a plug-in connection formed from a retaining lug, which contains at least one bore and which is disposed on the periphery of the shutter housing, together with a coacting plug-in pin, which is mounted on the carrier of the diaphragm setting device.

Since it is possible that the camera user will carry the instant diaphragm setting device loosely in a clothing pocket, or the like, precautions should be taken to assure that there will be no possibility of the plug-in pin, disposed on the setting slide, becoming hooked or caught in any clothing or the like, nor of its becoming bent. Thus, for the protection of this plug-in pin, a hoodlike protective surface or shell may be provided on the carrier, such that the surface concentrically surrounds the plug-in pin, and for instance has a semi-circular cross-section.

In order to provide a simple locking for such a diaphragm setting device, when attached to the lens shutter, a locking member may be advantageously provided according to the present invention, which is movably guided relative to the hoodlike surface or shell and rotatably located on the plug-in pin, and which has a locking tooth which cooperates with a locking edge provided on the retaining lug on the shutter housing. In addition, the locking member may suitably have a semicylindrical shape, which is adapted to the hoodlike surface, and which is rotatably and resiliently supported relative thereto outwardly of the centrally disposed plug-in pin.

Referring to the drawings, a lens shutter arrangement or housing 1, which is designed for instance as a self-cocking shutter, is shown, which in the usual way is provided with a lens, and which in this instance is envisaged, in particular, for use in medium- and large-sized professional cameras, i.e. for cameras which are used for studio work as well as for scientific photography. The lens shutter arrangement 1 includes a backward- and forward-pivoting segment system 2 and also a conventional mechanical diaphragm, though the drawing only shows the diaphragm setting or adjusting ring 4 thereof.

The diaphragm adjusting ring 4 is manually operatable by means of grip part or drive part 3, and is rotatably disposed on the rear of the lens shutter 1 and cooperates with the diaphragm blades (not shown). In addition to a radial arm 4a which is used for the mounting of the grip part 3, the diaphragm adjusting ring 4 comprises an indicator mark or pointer 4b which, as FIG. 1 shows, is associated with a counterpart diaphragm scale of the type normally provided on the side or barrel wall of the shutter housing.

As can also be seen from FIG. 1, the central interlens shutter 1, which in this instance is designed as a self-cocking shutter, includes, in addition to the usual cocking and releasing lever which is provided with a grip part 5, two threaded connecting pieces 6 and 7 of the type which are normally used for the connection of appropriate cable releases, the connecting piece 6 being associated in the usual way with the release mechanism (not shown) of the shutter.

The other connecting piece 7 is associated with a mechanism (not shown), which is accommodated inside the shutter housing, and by means of which in conventional manner the segments and/or the diaphragm blades are temporarily movable into the fully open position and back again from the initial position, which they adopt according to their operation or pre-setting, for the purpose of focal plane viewing prior to a photograph being taken, as the artisan will appreciate.

In the case of professional and studio cameras in which focussing and diaphragm setting is carried out in dependence upon the ground glass screen image which appears in the rear ground glass screen or cassette frame on the camera, it is desirable and of great technical advantage if the monitoring and setting of the working diaphragm aperture can be effected from the back of the camera, i.e. from the standing position of the photographer during the time the camera user is carrying out focal plane viewing operations.

For this purpose, a manually operatable diaphragm setting adevice is provided according to the present invention, which comprises only a few stamped components and which can be readily and easily mounted, as an additional or extraneous add-on mechanism, on the periphery of the housing of the shutter arrangement 1.

The main components of the instant diaphragm setting device are a carrier 10, which is mounted on the outer periphery of the shutter housing 1, e.g. by means of screws 9, and an adjusting slide 11 which is relatively movably disposed on the carrier 10, one free end of the adjusting slide 11 being connected, in an articulated manner, e.g. by way of a floating linkage type articulated connection, to the adjusting ring 4, preferably to its grip part 3.

While the adjusting slide 11 is relatively movably guided on the carrier 10, preferably by means of a pin 12 and guide slot 10a connection, and is provided on each of its obverse (FIG. 1) and reverse (FIG. 2) faces with a scale 11a which serves to indicate the range of operating diaphragm values, i.e. corresponding to those on the diaphragm scale on the shutter housing barrel (cf. FIG. 1), the carrier 10 includes two laterally opposed arms 10b which are associated with the adjusting slide 11 on both sides or edges thereof.

More specifically, the outer ends of the carrier arms 10b are designed as free end pointers facing each other and fulfill the function of a bilaterally indicating composite counterpart setting mark or indicator mark at each edge and with respect to each of the obverse and reverse faces of the adjusting slide 11.

With regard specifically to the guide slot 10a in the carrier 10, this slot 10a is of particular selective arcuate shape, as can be seen especially from FIG. 2. This arcuate shape, in turn, is adapted concordantly or correspondingly to the similar circular path of movement of the floating articulated connection produced by detachable plug-in pin 14 between the setting slide 11 of the diaphragm setting device and the adjusting ring 4 on the lens shutter 1. By means of this articulated connection, apart from a slight yet negligible lateral migratory movement (cf. FIG. 2), a substantially linear or more or less straightline vertical course of movement can be achieved for the adjusting slide 11 relative to the longitudinal axis of the carrier 10.

However, a prerequisite for insuring such straight line or non-tilting movement is that the guide slot 10a is formed in the stationary carrier 10 and the guide pin 12 is mounted at a fixed point on the displaceable adjusting slide 11.

In this regard, the linear distance from the floating pivot axis of the articulated connection provided by plug-in pin 14, between the lower end portion of the more or less tangentially linearly moving slide 11 and the circularly or rotationally moving grip part 3 of the diaphragm adjusting ring 4, to the pivot axis of the guide pin 12 is accordingly a fixed distance, which causes slide 11 to move more or less vertically relative to the fixedly positioned carrier 10, i.e. within guide slot 10a, with a maximum lateral or transverse deviation of slide 11 relative to carrier 10 which is limited, i.e. along the corresponding range of movement of grip part 3, to the distance or width between the chord of the arc of guide slot 10a corresponding to such range of movement of grip part 3 and a line parallel to such chord and tangent to such arc.

In order to be able to use the above-mentioned diaphragm setting device universally, i.e. even with those types of professional or studio cameras wherein, for the purpose of obtaining extremely short focal lengths, the front lens panel 16 extends into the chamber of the bellows 17 of the camera, the carrier 10 is suitably provided with an angled portion or offset supporting portion 10c so as to displace the guide member portion or main slide mounting portion 10d of the carrier 10 which carries the adjusting slide 11 sufficiently forward relative to the camera, and move especially relative to front lens panel 16 and bellows 17, that, after the carrier 10 has been mounted on the shutter housing, the adjusting slide 11 is disposed in a plane lying in front of the front plate 1a of the shutter housing 1, as can clearly be seen from FIG. 3.

In addition, the bilateral indicator arm 10b of the carrier 10 are designed to be of such a length that they protrude over or outwardly and upwardly beyond the front lens panel 16 so as thereby to enable the photographer, who is effecting the exposure setting, to read the scale value on the reverse face (cf. FIG. 2) of the adjusting slide 11 without interference, i.e. from his position standing behind the camera.

The adjusting slide 11 can be provided with gripping shells or manual grasping means 18, to facilitate gripping and moving of the adjusting slide 11 and in turn the remote adjusting of the diaphragm ring 4. For this purpose, the gripping shells 18 may be suitably provided with concave cross-sections, and being disposed on both sides or faces of the free end or upper end portion of the adjusting slide 11, as shown in FIG. 1, may be readily grasped by the fingers thereat.

It is desirable that the few components which are needed for the manufacture of the diaphragm setting device according to the present invention, such as the carrier 10 and the adjusting slide 11, simply be made of sheet metal, e.g. by a stamping process.

Significantly, when fitting the instant device to a camera, neither the shutter nor any other components need to be dismounted from the lens panel of the camera.

The reason why such components need not be dismounted when so fitting the instant device, is simply because the carrier 10 is readily stationarily attached by screws, e.g. screws 9, to the shutter housing, i.e. at a conveniently accessible exterior location which is provided with prepared threaded bores, e.g. on the barrel of the shutter housing 1 (cf. FIG. 2), and because the articulated connection between the grip part 3 of the lens shutter 1 and the movable adjusting slide 11 is in turn provided by means of the floating plug-in pin 14, i.e. similarly at a conveniently accessible exterior location, which may be suitably in the form of a quick connect and quick disconnect snap-in type pin connection with a mating aperture or bore (not shown) in grip part 3 as the artisan will appreciate.

With folding or base board cameras which, as is well-known, have a base board which has to be folded under for setting-up purposes and has to be moved back again into the initial position for a photograph to be taken, a significant and practicable application of the diaphragm setting device according to the present invention is only insured if this device, which is generally larger than the dimensions of the base board and which therefore can only remain on the camera for the duration of the preliminary setting-up operations, i.e. prior to taking a photograph, can be attached to the camera in a relatively short time and can also be easily removed from the camera. For this purpose, according to the alternative embodiment as shown in FIGS. 4 and 5, a particular type of quick connect and quick disconnect snap-in type plug-in connection is provided which substantially comprises a retaining lug 20, which has a receiving bore 20a and which can be fixedly attached to the shutter housing 1, and a cooperating plug-in pin 21, which is fixedly disposed on the carrier 10.

The plug in pin 21 has associated therewith a partially outwardly surrounding hoodlike shell portion 22 which is semi-circular in cross-section, i.e. semi-cylindrical, which is securely connected to carrier 10, and which partially surrounds the pin 21 in spaced relation thereto to provide a rather large clearance space therebetween for coacting relative insertion of retaining lug 20 thereat.

As can be clearly seen from FIGS. 4 and 5, in order to secure the diaphragm setting device in the attached position, the semi-cylindrical shell 22 has associated therewith a lock member 23, which is also semi-circular, i.e. a half-cylinder, and which is provided with a locking tooth 23a. The lock member 23 is adapted to the shape of the surface of shell portion 22, i.e. is also semi-cylindrical, and is rotatably mounted on the plug-in pin 21.

More specifically, the lock member 23 is sufficiently thin in annular thickness to be rotatably disposed immediately inwardly of the stationary shell 22 and in the rather large clearance space, yet sufficiently radially outwardly of the plug-in pin 21 on which it is operatively rotatably mounted to provide a resultant annular clearance space between the inner surface of the lock member 23 and the outer confines of the plug-in pin 21 correspondingly sufficient to permit reception thereat of the retaining lug 20, i.e. when connecting the carrier 10 to the shutter housing 1.

A spring (not shown) is provided so as to keep the lock member 23, which is prevented from being axially displaced by means of a pin 24 and slot guide 25, in an end rotational locking position. In its end position, as can be seen especially from FIG. 4, the locking tooth 23a engages axially behind a locking edge 20b, formed on the retaining lug 20, and thereby prevents the diaphragm setting device from becoming axially detached unintentionally.

In accordance with the foregoing, the two opposing or facing surfaces of shell 22 and lock member 23 are movably supported rotationally one relative to the other by means of such spring and, in addition, the locking tooth 23a of the lock 23 is disposed relative to the locking edge 20b of the retaining lug 20 in such a manner that, when the diaphragm setting device is attached to the shutter housing 1, the locking tooth 23a, against the restoring or counterrotational spring action, runs axially over and beyond the locking edge 20b of the retaining lug 20 and rotationally drops behind this edge projection at the end of the axial insertion sliding movement, i.e. in the manner of a spring urged latch.

If the diaphragm setting device is to be removed from the shutter housing 1, the pin 24, which is securely connected to the lock member 23, i.e. through the slot 25 in shell portion 22, only needs to be actuated against the action of the restoring spring, e.g. by finger pressure rotationally exerted on the pin 24, whereby the locking tooth 23a moves upwardly or rotationally and becomes disengaged at the locking edge 20b. In turn, the diaphragm setting device can then be axially displaced to cause the plug in pin 21, disposed on the carrier 10, to leave the bore 20a in the retaining lug 20.

It will be appreciated of course that because of the concentric relation between the hoodlike shell portion 22 and the plug-in pin 21 and the semi-circular extent of such shell portion 22, when the pin 21 is inserted in the receiving bore 20a of the retaining lug 20 the lateral sides of the shell portion 22 are preferably dimensioned so as to effectively engage the upper or circumferential surface portion of the retaining lug 20 whereby to prevent any rocking or pivoting movement about the axis of plug-in pin 21 between the carrier 10 and the shutter housing 1 thereat.

On the other hand, the semi-circular extent of the lock member 23 is sufficiently less than that of the shell portion 22 to provide clearance between the portion of lock member 23 on the lateral side thereof remote from the locking tooth 23a and the adjacent area of the upper or circumferential surface portion of the retaining lug 20 thereat, i.e. to permit rotational movement of the lock member 23 when unlocking the lock member via pin 24.

Alternatively, the carrier 10 may be provided with an arcuate surface portion for seatingly engaging the adjacent portion of the barrel of the shutter housing 1 similar to the configuration shown in FIG. 2, but on which the plug-in pin connection parts as shown in FIGS. 4 and 5 are provided in place of screw apertures and screws 9 for achieving the desired detachable connection between the carrier 10 and the shutter housing 1. Hence, such arcuate surface portion, i.e. concentric to the barrel of the shutter housing 1 and selectively dimensioned in relation to the concentric disposition and coacting dimensions of the plug-in pin 21, shell portion 22, lock member 23 and retaining lug 21, will maintain the carrier 10 in stationary retaining engagement with the shutter housing 1 so as to prevent any possible rocking or pivoting movement about the axis of plug-in pin 21 between the carrier 10 and the shutter housing 1.

On the other hand, by simply providing an extra plug-in pin and retaining lug bore in the plug-in connection arrangement, or a similar non-rotatable constructional arrangement, the same result will be achieved as no such rocking or pivoting movement would be possible under such circumstances.

In view, therefore, the present invention advantageously concerns a diaphragm setting device arrangement for a photographic camera comprising a lens shutter housing having a displaceable diaphragm adjusting ring adapted for selectively adjusting the diaphragm of the shutter thereof in conjunction with a diaphragm setting scale and a counterpart indicator mark, and a diaphragm setting device, which may be provided as an add-on or detachable accessory, i.e. on the front rather than the rear of the shutter.

Such diaphragm setting device includes an elongate carrier mounted on the shutter housing and extending substantially tangentially relative to the shutter housing, and a setting slide slidably guided on and movable relative to the carrier and disposed in operational engagement with the diaphragm adjusting ring, the setting slide being slidably guided on the carrier by means of a pin and slot connection and having a slide end portion articulatedly connected directly to the diaphragm adjusting ring by means of an articulated connection.

More particularly, the articulated connection between the setting slide and the displaceable diaphragm adjusting ring may be arranged for displacement along a circular path of movement, i.e. corresponding to the movement path of the diaphragm adjusting ring, and the pin and slot connection may include a guide slot operatively correspondingly adapted to such circular path of movement for moving the setting slide relative to the carrier along a concordant guide path.

Preferably, the diaphragm adjusting ring is provided with a grip part and the setting slide is articulatedly connected to the grip part.

According to a particular preferred constructional feature herein, the shutter housing has a front plate, and the carrier has a supporting portion which is formed by an angled part and which provides a corresponding slide face for the setting slide which is disposed in a plane in front of the front plate of the shutter housing.

According to another particular preferred, yet alternative, constructional feature herein, a detachable plug-in connection containing an automatic locking means is provided for connecting the carrier retainedly to the shutter housing and which is automatically made secured by the locking means upon connecting the carrier to the shutter housing.

Specifically, the plug-in connection may be formed by a retaining lug disposed on the shutter housing and having at least one bore therein, and by a coacting plug-in pin mounted on the carrier. Moreover, a shell portion having a substantially semi-circular cross section may be disposed on the carrier in substantially concentrically surrounding relation to the plug-in pin.

Additionally, a locking member may be provided which is rotatably located on the plug-in pin and movably guided relative to the shell portion, and which has a locking tooth which cooperates with a locking edge provided on the retaining lug. In this regard, the locking member may be provided with a substantially semi cylindrical shape which is operatively adapted to the corresponding shape and surface of the shell portion, and the locking member may be rotatably and resiliently supported relative to the shell portion.

Hence, such diaphragm setting device arrangement may be conveniently disposed such that the shutter housing may be mounted in the usual way on a photographic camera.

Stated another way, the present invention advantageously broadly concerns a diaphragm setting device adapted to the mounted, e.g. as an add on or detachable accessory, on a shutter housing for a photographic camera having a displaceable diaphragm adjusting ring adapted for selectively adjusting the diaphragm of the shutter thereof in conjunction with a diaphragm setting scale and a counterpart indicator mark.

Such diaphragm setting device comprises an elongate carrier having stationary tangential mounting means (cf. FIGS. 1 and 2, and FIGS. 4 and 5, respectively) arranged for stationarily mounting the carrier on such a shutter housing such that the elongate carrier extends substantially tangentially relative to such shutter housing, and a setting slide slidably guided on and movable relative to the carrier and arranged for operational engagement with such a diaphragm adjusting ring, the setting slide being slidably guided on the carrier by guiding displacement interconnecting means arranged for operatively guidingly interconnecting the setting slide and the carrier for such relative movement and having a slide and portion provided with a floating articulated connection means arranged for articulatedly directly operatively connecting the setting slide to such diaphragm adjusting ring for operational engagement of the setting slide with such diaphragm adjusting ring.

More particularly, the floating articulated connection means may be arranged for displacement along a circular path of movement, i.e. corresponding to the movement path of the diaphragm adjusting ring, and the guiding displacement interconnecting means may be operatively correspondingly adapted to such circular path of movement for moving the setting slide relative to the carrier along a concordant guide path.

In this regard, the guiding displacement inter-connecting means preferably includes a pin and slot connection. More specifically, the pin ahd slot connection may include a guide slot operatively correspondingly adapted to such circular path of movement for moving the setting slide relative to the carrier along such concordant guide path. More especially, the pin and slot connection preferably includes a pin on the setting slide and a cooperating guide slot in the carrier and operatively correspondingly adapted to such circular path of movement for moving the setting slide relative to the carrier along such concordant guide path.

According to a particular preferred constructional feature herein, the carrier has a supporting portion which is selectively forwardly offset from the stationary tangential mounting means and which provides a corresponding slide face for the setting slide which is disposed in a plane correspondingly selectively forwardly of the stationary tangential mounting means.

The stationary tangential mounting means may include a shutter housing engaging arcuate portion adapted to be detachably screw connected to the shutter housing (cf. FIG. 2). Alternatively, the stationary tangential mounting means may include one corresponding part of a two part automatically self-locking detachable plug-in connection (cf. FIGS. 4 and 5) comprising a coacting pin part and a coacting pin receiving retaining lug part, and which is adapted to be operatively connected with the other corresponding part on such a shutter housing for connecting the carrier retainedly to such shutter housing.

Thus, the diaphragm setting device may be detachably mounted on a shutter housing for a photographic camera having a displaceable diaphragm adjusting ring adapted for selectively adjusting the diaphragm of the shutter thereof in conjunction with a diaphragm setting scale and a counterpart indicator mark, with the stationary tangential mounting means in turn arranged stationarily mountedly on the shutter housing such that the elongate carrier extends substantially tangentially relative to the shutter housing, and the floating articulated connection means on the slide end portion is arranged in articulated direct operative connection with the diaphragm adjusting ring for operational engagement of the setting slide with such diaphragm adjusting ring. In such arrangement, more specifically, the stationary tangential mounting means may include one corresponding part of a two part automatically self-locking detachable plug-in connection comprising a coacting pin part and a coacting pin receiving retaining lug part, and the shutter housing is provided with the other corresponding part fixedly mounted thereon for connecting the carrier retainedly to the shutter housing.

Advantageously, therefore, the instant diaphragm setting device may be readily attached to and detached from the shutter housing of a photographic camera at a convenient adaptable and accessible position, which does not obstruct the necessary operating parts of the shutter and camera nor interfere with camera preparation and adjustment operations, regardless of the type of camera, because of the adaptable selective manner of mounting and supporting the carrier and setting slide relative to each other and relative to the shutter housing, and in turn the corresponding manner of operatively interconnecting the carrier and setting slide and of operatively connecting the setting slide directly with the diaphragm adjusting ring of the shutter housing, i.e. all at the front of the shutter housing.

The exterior manner of mounting the instant diaphragm setting device on the shutter housing, i.e. exactly reproducibly in the same position on the shutter housing each time, e.g. via screws 9 and plug in pin 14 (cf. FIGS. 1 and 2), or via the plug-in connection parts 21 to 25 and such plug in pin 14 (cf. FIG. 1 and 4 to 5), which mounting is readily constructionally selectively adaptable to any type of camera front lens panel and front shutter plate arrangement (cf. FIGS. 1 and 3), avoids the need for disassembling, reassembling, adjusting or readjusting any parts of the camera or shutter housing when mounting or dismounting the instant diaphragm setting device as well as the need for extraneous tools to accomplish the same, save for a screw driver or the like where the alternative, i.e. optional, mounting connection contemplates screws 9 (cf. FIG. 2).

All of the foregoing is accomplished with only two main components, i.e. the carrier 10 and the setting slide 11, which may be fabricated inexpensively as uncomplicated more or less precisely operating constructional parts, e.g. interconnected via a pin and slot connection, and provided with a simple plug-in pin articulated connection for achieving concordant operational engagement of the setting slide with the diaphragm adjusting ring, and also with either a simple screw or the like stationary connection between the carrier and the shutter housing or an efficient detachable plug-in pin and retaining lug type coacting part connection between such carrier and shutter housing, i.e. at a selective mounting location on the shutter housing for achieving as aforesaid such exact reproducibility of the instant diaphragm setting device in the same position on the shutter housing each time.

Most importantly, however, in accordance with the present invention, as may be seen from the foregoing, an add-on type diaphragm setting device is provided which, in complete contrast to the rear mounting of the aforesaid known add-on type of diaphragm setting device and its inherent complexity and attendant disadvantages, may be readily and easily detachably mounted on the front of the shutter or shutter housing, i.e. externally on the shutter housing at a conveniently accessible exterior front location thereon, without the need to disassemble and reassemble and/or adjust or readjust any parts of the shutter or shutter housing, and merely by screw or plug-in or the like detachable connecting means between the coacting and/or conforming contact support portions of the carrier and the shutter housing, e.g. the shutter housing front barrel portion, and in turn by plug-in or the like detachable connecting means operatively between the adjusting slide on the carrier and the diaphragm adjusting ring on the shutter housing, e.g. via the exposed manual grip part or the like normally provided for adjusting the diaphragm adjusting ring.

It will be appreciated that the foregoing specification and accompanying drawings are set forth by way of illustration and not limitation, and that various changes and modifications may be therein without departing from the spirit and scope of the present invention which is to be limited solely by the scope of the appended claims.

What is claimed is:

1. Diaphragm setting device arrangement for a photographic camera comprising a lens shutter housing having a displaceable diaphragm adjusting ring adapted for selectively adjusting the diaphragm of the shutter thereof in conjunction with a setting scale and a counterpart indicator mark, and a diaphragm setting device including an elongate carrier mounted on the outer periphery of the shutter housing and extending substantially tangentially relative to the shutter housing, and a setting slide slidably guided on and movable relative to the carrier and disposed in operational engagement with the diaphragm adjusting ring, the setting slide being slidably guided on the carrier by means of a pin and slot connection and having a slide end portion articulatedly connected directly to the diaphragm adjusting ring by means of an articulated connection.

2. Arrangement according to claim 1 wherein the articulated connection between the setting slide and the displaceable diaphragm adjusting ring is arranged for displacement alng a circular path of movement, and the pin and slot connection includes a guide slot operatively correspondingly adapted to such circular path of movement for moving the setting slide relative to the carrier along a concordant guide path.

3. Arrangement according to claim 1 wherein the diaphragm adjusting ring is provided with a grip part and the setting slide is articulatedly connected to the grip part.

4. Arrangement according to claim 1 wherein the shutter housing has a front plate, and the carrier has a supporting portion which is formed by an angled part and which provides a corresponding slide face for the setting slide which is disposed in a plane in front of the front plate of the shutter housing.

5. Arrangement according to claim 1 wherein a detachable plug-in connection containing an automatic locking means is provided for connecting the carrier retainedly to the shutter housing and which is automatically made secure by the locking means upon connecting the carrier to the shutter housing.

6. Arrangement according to claim 5 wherein the plug-in connection is formed by a retaining lug disposed on the shutter housing and having at least one bore therein, and by a coacting plug-in pin mounted on the carrier.

7. Arrangement according to claim 6 wherein a shell portion having a substantially semi-circular cross section is disposed on the carrier in substantially concentrically surrounding relation to the plug-in pin.

8. Arrangement according to claim 7 wherein a locking member is provided which is rotatably located on the plug-in pin and movably guided relative to the shell portion, and which has a locking tooth which cooperates with a locking edge provided on the retaining lug.

9. Arrangement according to claim 8 wherein the locking member is provided with a substantially semi-cylindrical shape which is operatively adapted to the corresponding shape and surface of the shell portion, and the locking member is rotatably and resiliently supported relative to the shell portion.

10. Arrangement according to claim 1 wherein the shutter housing is mounted on a photographic camera.

11. Diaphragm setting device, adapted to be mounted operatively on the outer periphery of a shutter housing for a photographic camera having a displaceable diaphragm adjusting ring adapted for selectively adjusting the diaphragm of the shutter thereof in conjunction with a setting scale and a counter part indicator mark, comprising
an elongate carrier having stationary tangential mounting means arranged for stationarily mounting the carrier on such a shutter housing such that the elongate carrier extends substantially tangentially relative to such shutter housing, and
a setting slide slidably guided on and movable relative to the carrier and arranged for operational engagement with such a diaphragm adjusting ring, the setting slide being slidably guided on the carrier by guiding displacement interconnecting means arranged for operatively guidingly interconnecting the setting slide and the carrier for such relative movement and having a slide end portion provided with a floating articulated connection means arranged for articulatedly directly operatively connecting the setting slide to such diaphragm adjusting ring for operational engagement of the setting slide with such diaphragm adjusting ring.

12. Device according to claim 11 wherein the floating articulated connection means is arranged for displacement along a circular path of movement, and the guiding displacement interconnecting means is operatively correspondingly adapted to such circular path of movement for moving the setting slide relative to the carrier along a concordant guide path.

13. Device according to claim 12 wherein the guiding displacement interconnecting means includes a pin and slot connection.

14. Device according to claim 13 wherein the pin and slot connection includes a guide slot operatively correspondingly adapted to such circular path of movement for moving the setting slide relative to the carrier along such concordant guide path.

15. Device according to claim 13 wherein the pin and slot connection includes a pin on the setting slide and a cooperating guide slot in the carrier and operatively correspondingly adapted to such circular path of movement for moving the setting slide relative to the carrier along such concordant guide path.

16. Device according to claim 11 wherein the carrier has a supporting portion which is selectively forwardly offset from the stationary tangential mounting means and which provides a corresponding slide face for the setting slide which is disposed in a plane correspondingly selectively forwardly of the stationary tangential mounting means.

17. Device according to claim 11 wherein the stationary tangential mounting means includes a shutter housing engaging arcuate portion adapted to be detachably screw connected to the shutter housing.

18. Device according to claim 11 wherein the stationary tangential mounting means includes one corresponding part of a two part automatically self-locking detachable plug-in connection comprising a coacting pin part and a coacting pin receiving retaining lug part, and adapted to be operatively connected with the other corresponding part on such a shutter housing for connecting the carrier retainedly to such shutter housing.

19. Device according to claim 11 wherein the diaphragm setting device is mounted on the outer periphery of a shutter housing for a photographic camera having a displaceable diaphragm adjusting ring adapted for selectively adjusting the diaphragm of the shutter thereof in conjunction with a setting scale and a counterpart indicator mark, the stationary tangential mounting means is arranged stationarily mountedly on the shutter housing such that the elongate carrier extends substantially tangentially relative to the shutter housing, and the floating articulated connection means on the slide end portion is arranged in articulated direct operative connection with the diaphragm adjusting ring for operational engagement of the setting slide with such diaphragm adjusting ring.

20. Device according to claim 19 wherein the stationary tangential mounting means includes one corresponding part of a two part automatically self-locking detachable plug-in connection comprising a coacting pin part and a coacting pin receiving retaining lug part, and the shutter housing is provided with the other corresponding part fixedly mounted thereon for connecting the carrier retainedly to the shutter housing.

21. Device according to claim 19 wherein the diaphragm setting device is mounted on the normally exposed front portion of the shutter housing.

* * * * *